United States Patent [19]
Ellis et al.

[11] Patent Number: 5,739,978
[45] Date of Patent: Apr. 14, 1998

[54] CARTRIDGE HANDLING SYSTEM WITH MOVING I/O DRIVE

[75] Inventors: John F. Ellis; Daniel W. Hoekstra, both of Louisville, Colo.; Daniel J. Woodruff, Kalispell, Mont.

[73] Assignee: Exabyte Corporation, Boulder, Colo.

[21] Appl. No.: 649,250

[22] Filed: May 17, 1996

[51] Int. Cl.⁶ .................................................. G11B 15/68
[52] U.S. Cl. .................................................. 360/92
[58] Field of Search ...................................... 360/92

[56] References Cited

U.S. PATENT DOCUMENTS

| | | | |
|---|---|---|---|
| 4,984,106 | 1/1991 | Herger et al. | 360/92 |
| 5,237,467 | 8/1993 | Marlowe | 360/92 |
| 5,416,653 | 5/1995 | Marlowe | 360/92 |
| 5,498,116 | 3/1996 | Woodruff et al. | 360/92 X |
| 5,555,143 | 9/1996 | Hinnen et al. | 360/92 |

*Primary Examiner*—John H. Wolff
*Attorney, Agent, or Firm*—Nixon & Vanderhye, P.C.

[57] ABSTRACT

An automated cartridge handling system or library (20, 20') for storing cartridges (22) of information storage media comprises a cartridge holder (26); a tape drive (30) movably mounted with respect to the cartridge holder; and, a transport system (40) for transporting the tape drive (30) in a drive transport path (42) between a unloaded position and a cartridge loaded position. The cartridges (22) remain stationary in the library while the tape drive is transported between the unloaded position and the cartridge loaded position. The cartridge holder library has a plurality of apertures (70) which receive cartridge holders or spines (80). To retain the cartridge (22) within the spine, each spine has resilient cartridge retaining fingers (100) formed in its interior cavity (90) for engaging a notch (104) on the cartridge. Each spine is provided with stabilization flanges (112) for stabilizing the cartridge. Each spine has asymmetrical orientation flanges (116) so that the cartridge-laden spine can be inserted into the library only in an up-right orientation.

39 Claims, 13 Drawing Sheets

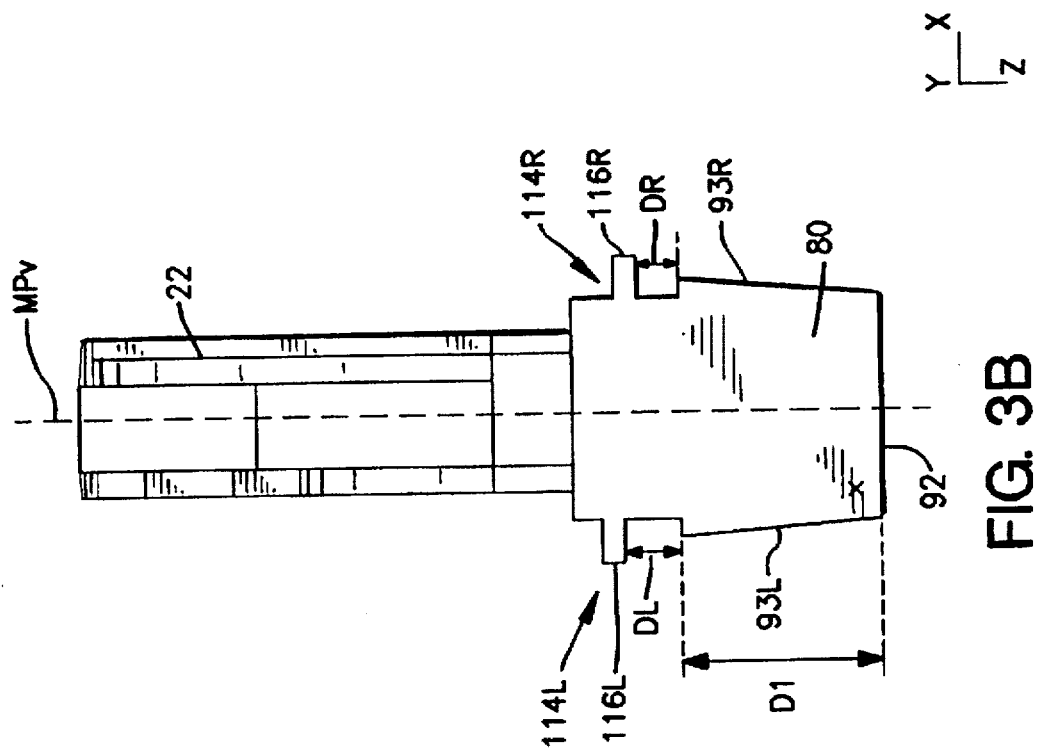
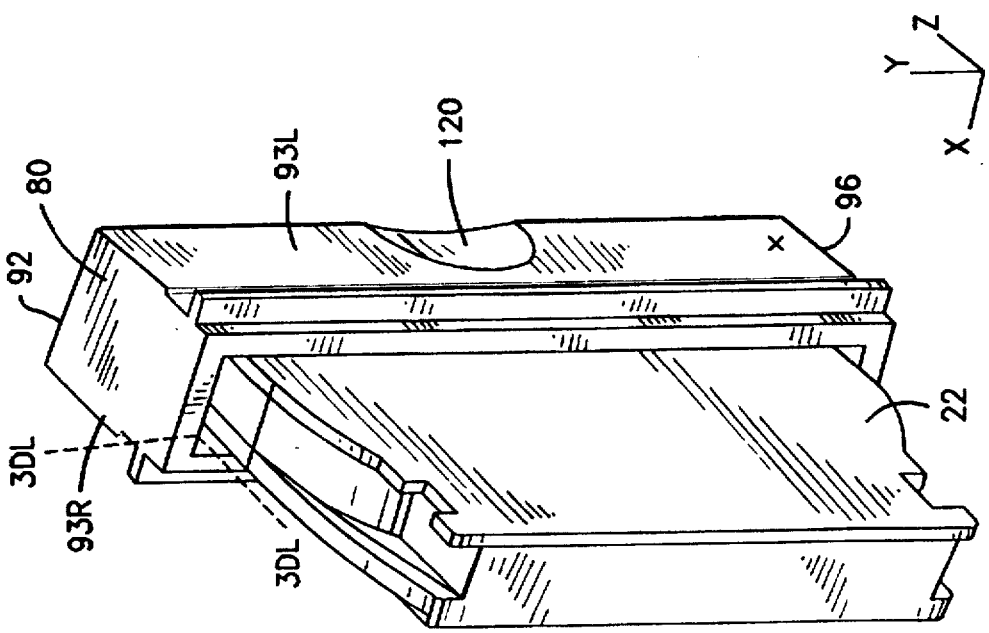
FIG. 3B
FIG. 3A

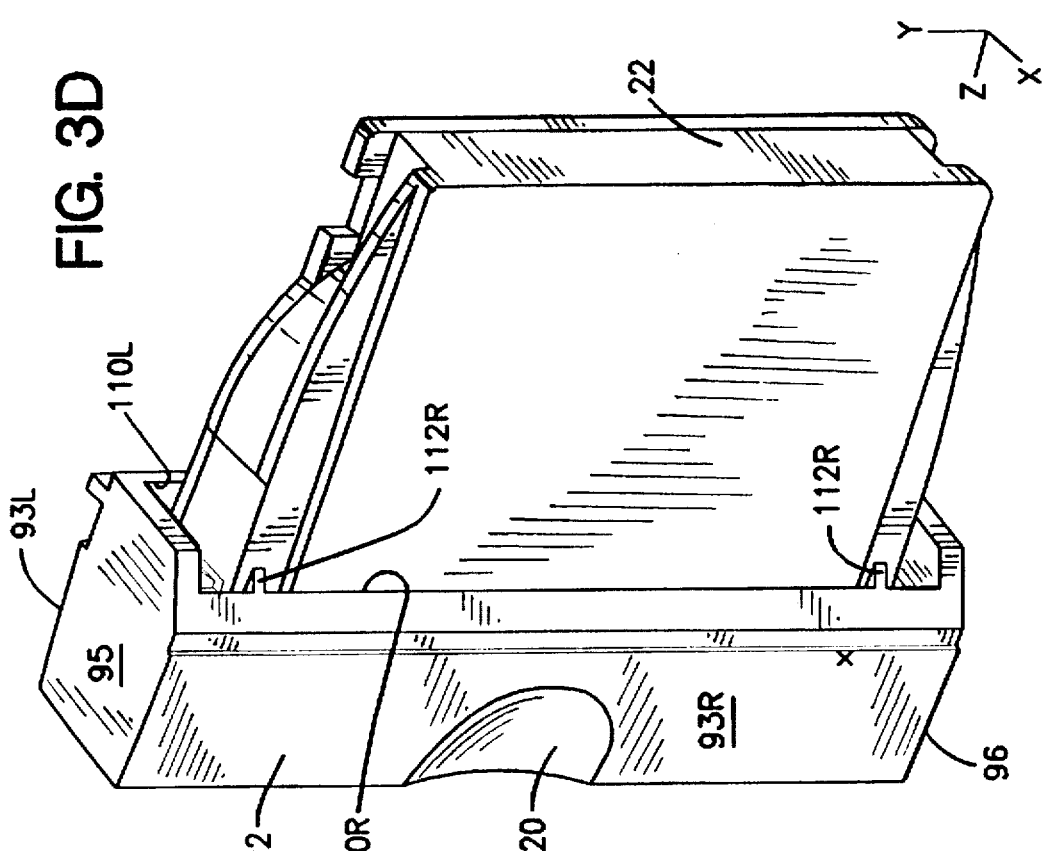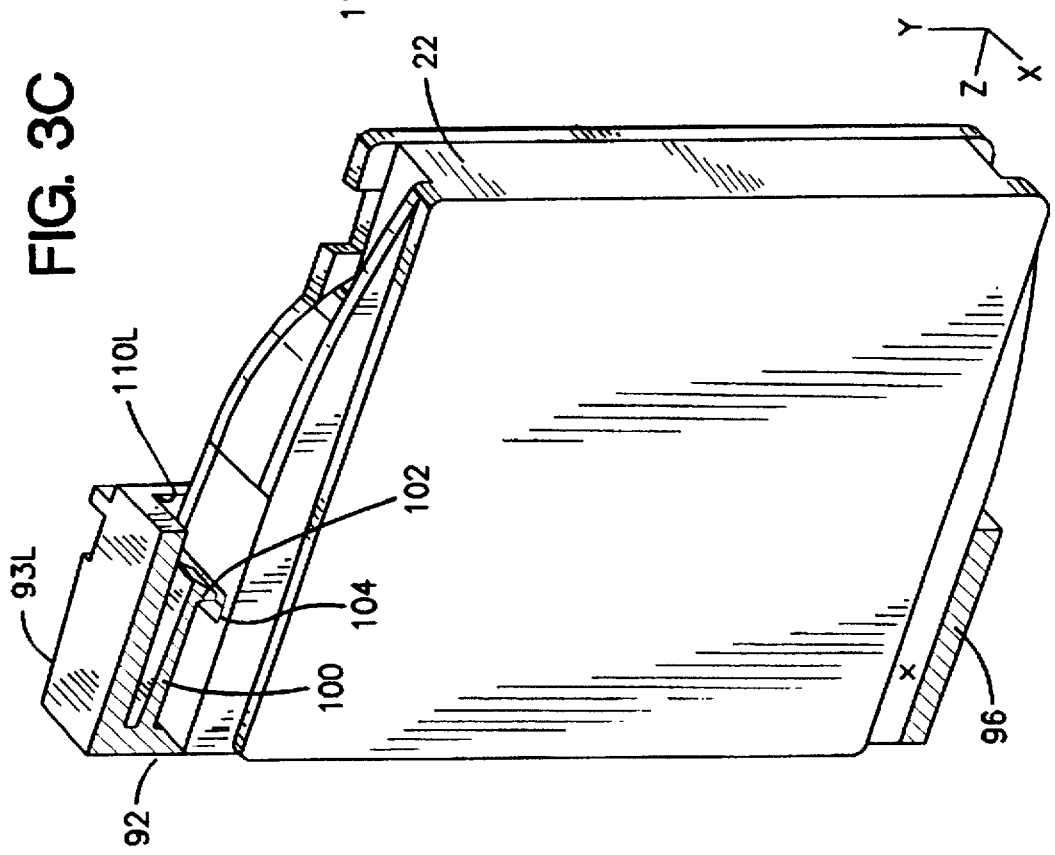

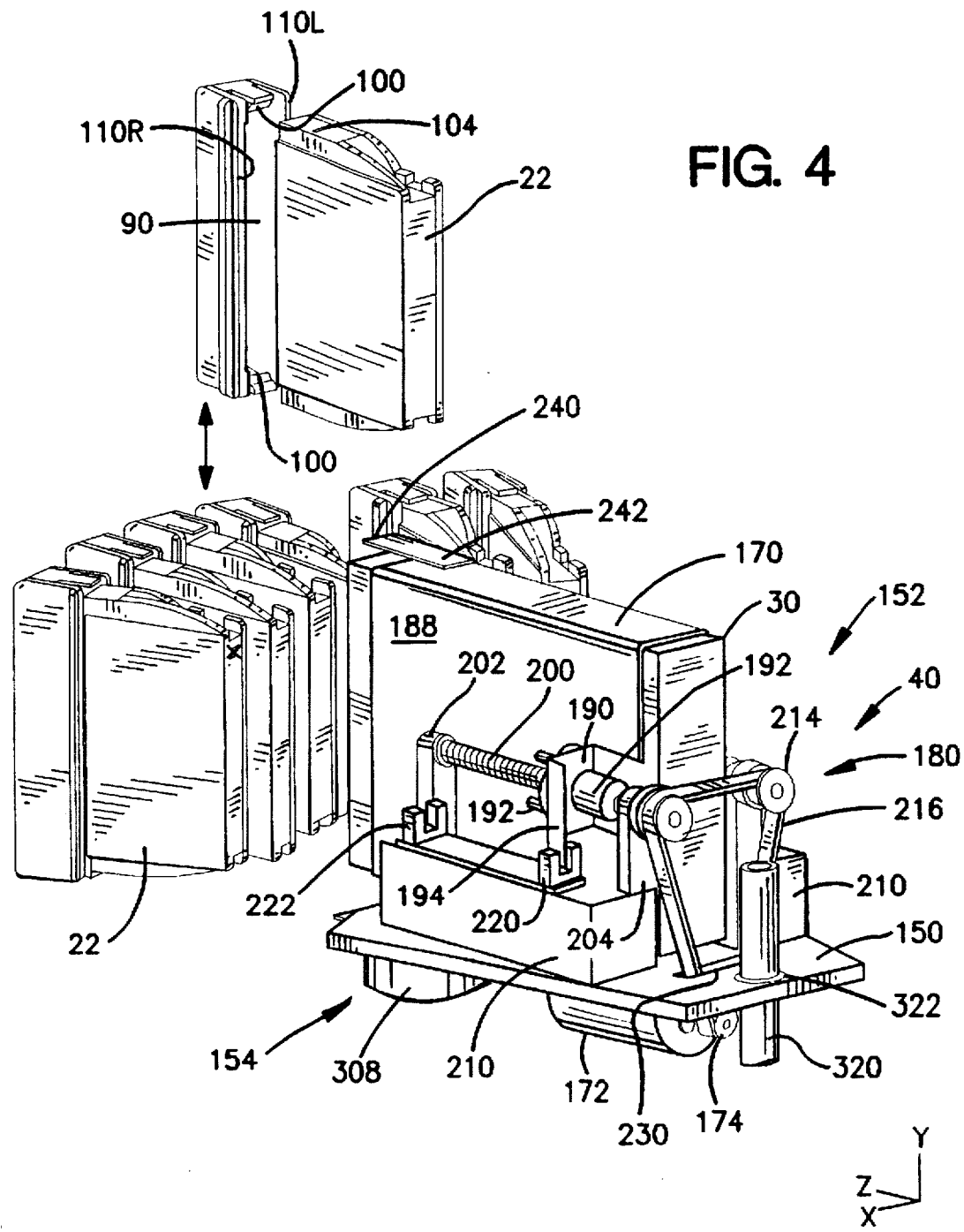

CARTRIDGE HANDLING SYSTEM WITH MOVING I/O DRIVE

BACKGROUND

1. Field of Invention

This invention pertains to the storage of information, and particularly to automated cartridge handling systems such as cartridge libraries which store cartridges or cassettes of magnetic tape.

2. Related Art and Other Considerations

The economic and compact storage of information is increasingly important in the computer industry, particularly so as the computer unleashes new potentials in numerous fields such as audio visual and/or multimedia.

In the early days of computers, information requiring storage could transmitted from a computer to a tape drive, whereat the information was magnetically recorded on or read from a large reel of tape. Upon completion of an operation of recording on the tape, for example, the reel would be removed manually from the tape drive and mounted in a rack. Another reel from the rack could then be manually mounted, if necessary, in the drive for either an input (tape reading) or output (recording to tape) operation.

Eventually it became popular to enclose magnetic tape in a cartridge, the cartridge being considerably smaller than the traditional tape reels. While many persons are familiar with tape cartridges of a type which can be loaded into a "tape deck" for reproduction of audio information (e.g., music), it is not as commonly realized that similar cartridges, although of differing sizes, can be used to store such information as computer data. For years now magnetic tape cartridges have proven to be an efficient and effective medium for data storage, including but not limited to computer back-up.

Large computer systems have need to access numerous cartridges. To this end, automated cartridge handling systems or libraries for cartridges have been proposed for making the cartridges automatically available to the computer. Many of these automated libraries resemble juke boxes. Typically, prior art automated cartridge libraries have an array of storage positions for cartridges, one or more tape drives, and some type of automated changer or cartridge engagement/transport mechanism for picking or gripping a cartridge and moving the cartridge between a storage position and the tape drive.

The following United States patents, all commonly assigned herewith and incorporated herein by reference, disclose various configurations of automated cartridge libraries, as well as subcomponents thereof (including cartridge engagement/transport mechanisms and storage racks for housing cartridges):

U.S. Pat. No. 4,984,106 to Herger et al., entitled "CARTRIDGE LIBRARY SYSTEM AND METHOD OF OPERATION THEREOF";

U.S. Pat. No. 4,972,277 to Sills et al., entitled "CARTRIDGE TRANSPORT ASSEMBLY AND METHOD OF OPERATION THEREOF";

U.S. Pat. No. 5,059,772 to Younglove, entitled "READING METHOD AND APPARATUS FOR CARTRIDGE LIBRARY";

U.S. Pat. No. 5,103,986 to Marlowe, entitled "CARTRIDGE RACK"; and,

U.S. Pat. Nos. 5,237,467 and 5,416,653 to Marlowe, entitled "CARTRIDGE HANDLING APPARATUS AND METHOD WITH MOTION-RESPONSIVE EJECTION".

U.S. Pat. No. 5,498,116 to Woodruff et al., entitled "ENTRY-EXIT PORT FOR CARTRIDGE LIBRARY".

U.S. Pat. No. 5,487,579 to Woodruff et al., entitled "PICKER MECHANISM FOR DATA CARTRIDGES".

Important to the automation of cartridge libraries as previously known has been the provision of the cartridge changer or cartridge engagement/transport mechanism for picking or gripping a cartridge and moving the cartridge between a storage position and the tape drive.

SUMMARY

An automated cartridge handling system or library for storing cartridges of information storage media comprises a cartridge holder housing; an input/output (I/O) tape drive movably mounted with respect to the cartridge holder; and, a transport system for transporting the tape drive in a drive transport path between an unloaded position and a cartridge loaded position. The cartridges remain stationary in the library while the tape drive is transported between the unloaded position and the cartridge loaded position.

In one embodiment, the cartridge holder of the library is a wall upon which the cartridges are stored. The holder wall has a plurality of apertures, each for accommodating a cartridge holder or spine. Each cartridge spine receives a cartridge. The spine positions and orients the cartridge for loading into the traveling tape drive. To retain the cartridge within the spine, each spine has resilient cartridge retaining fingers formed in its interior cavity for engaging a notch on the cartridge. Further, each spine is provided with stabilization flanges in its interior for stabilizing the cartridge within the spine. The interior stabilization flanges are configured so that the cartridge can be inserted therein only in a proper orientation (e.g., not in an inverted orientation). On its exterior each spine has asymmetrical orientation flanges so that the cartridge-laden spine can be inserted into the library only in an upright orientation.

In operation, a cartridge is positioned in a library by first inserting the cartridge into an interior cavity of a selected cartridge spine. When the cartridge is properly positioned within a cartridge spine, projections on cartridge retaining fingers engage notches in the cartridge. The cartridge is stabilized in the spine by opposing pairs of stabilization flanges. Then, the cartridge-laden spine is slid into an appropriate vacant aperture in the library. Sliding in a proper orientation is assured by the orientation flanges of the spine and orientation channels in the holder wall of the library.

When it is desired to conduct an input/output operation with respect to one of the cartridges housed in the library, an approach or radial displacement of tape drive to its cartridge loaded position occurs. If necessary, a selection or angular displacement of tape drive occurs (so that tape drive can be aligned with and have loaded therein a desired one of the plurality of cartridges with which to perform the input/output operation).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3A is a perspective view of a cartridge and a cartridge spine included in the cartridge library of FIG. 1.

FIG. 3B is a top view of the cartridge and cartridge spine of FIG. 3A.

FIG. 3C is a side view, partially broken centrally, of the cartridge and cartridge spine of FIG. 3A.

FIG. 3D is a side view, partially broken obliquely along line 3DL—3DL, of the cartridge and cartridge spine of FIG. 3A.

FIG. 4 is a rear isometric view of portions of the cartridge library of FIG. 1 without a housing.

DETAILED DESCRIPTION OF THE DRAWINGS

Figure 1A:
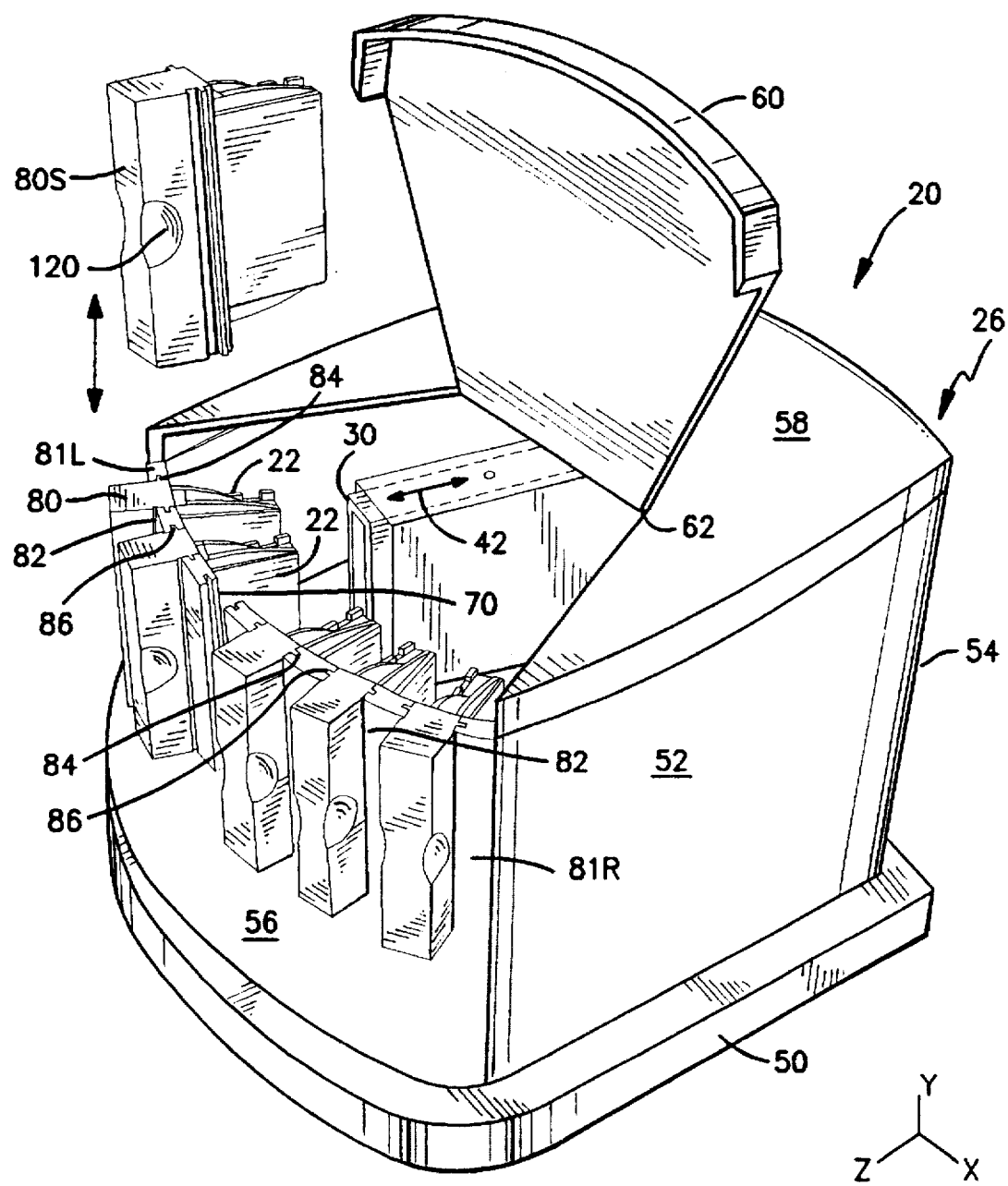
FIG. 1A is an isometric view of an opened cartridge library with a tape drive in a cartridge unloaded position according to an embodiment of the invention.
Figure 1B:
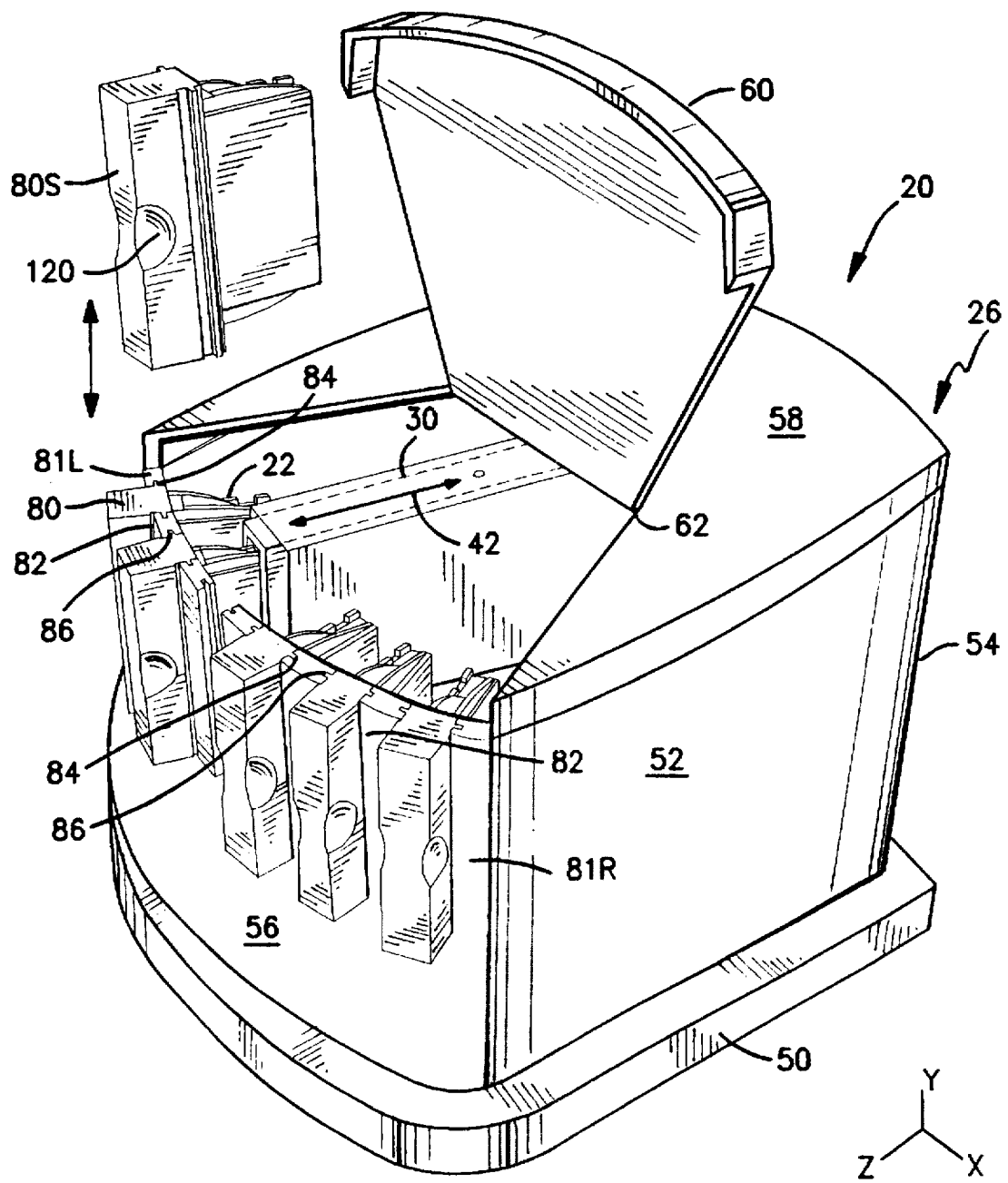
FIG. 1B is an isometric view of an opened cartridge library with a tape drive in a cartridge loaded position according to an embodiment of the invention.
Figure 6:
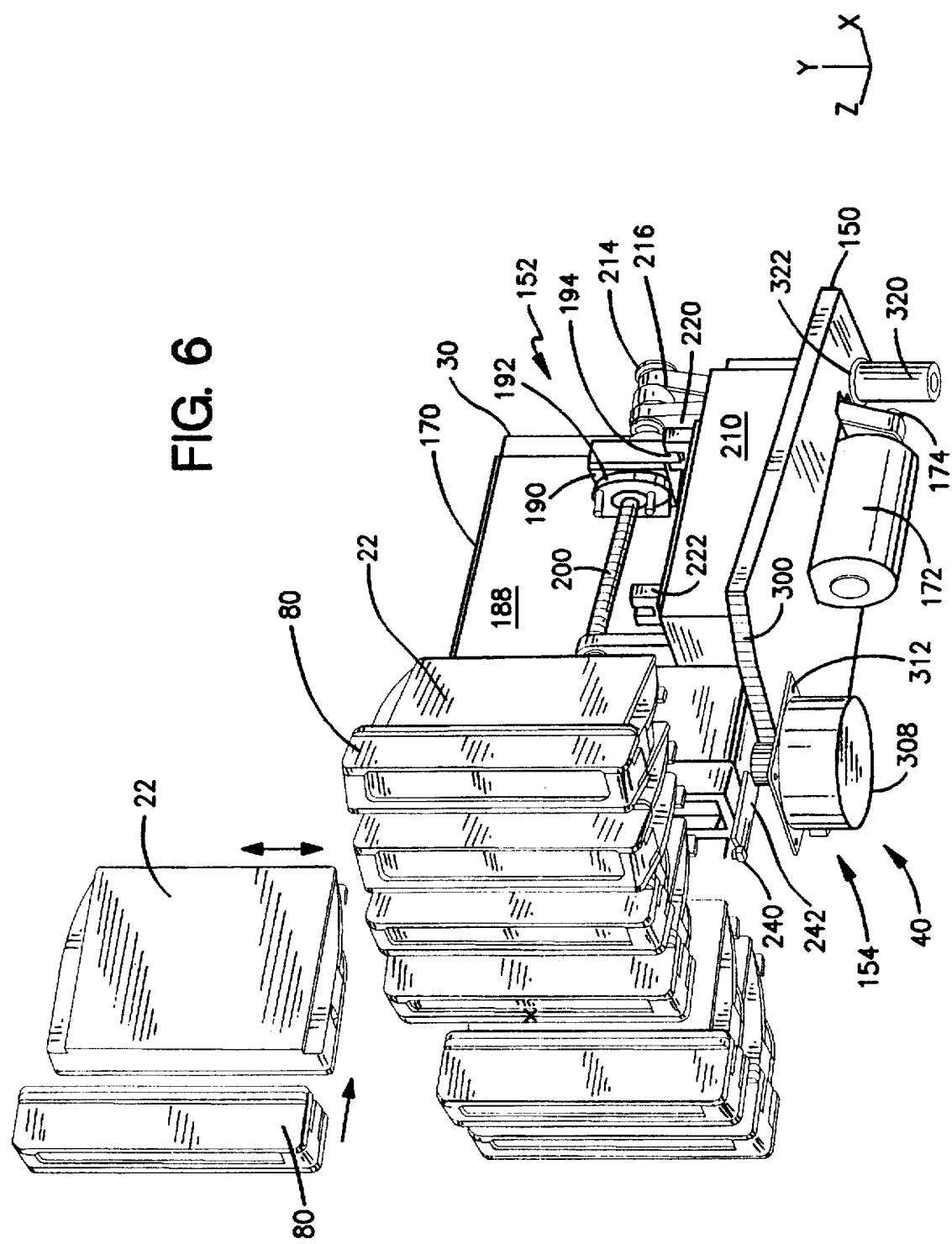
FIG. 6 is a front isometric view from below of portions of the cartridge library of FIG. 1 without a housing.
Figure 7A:
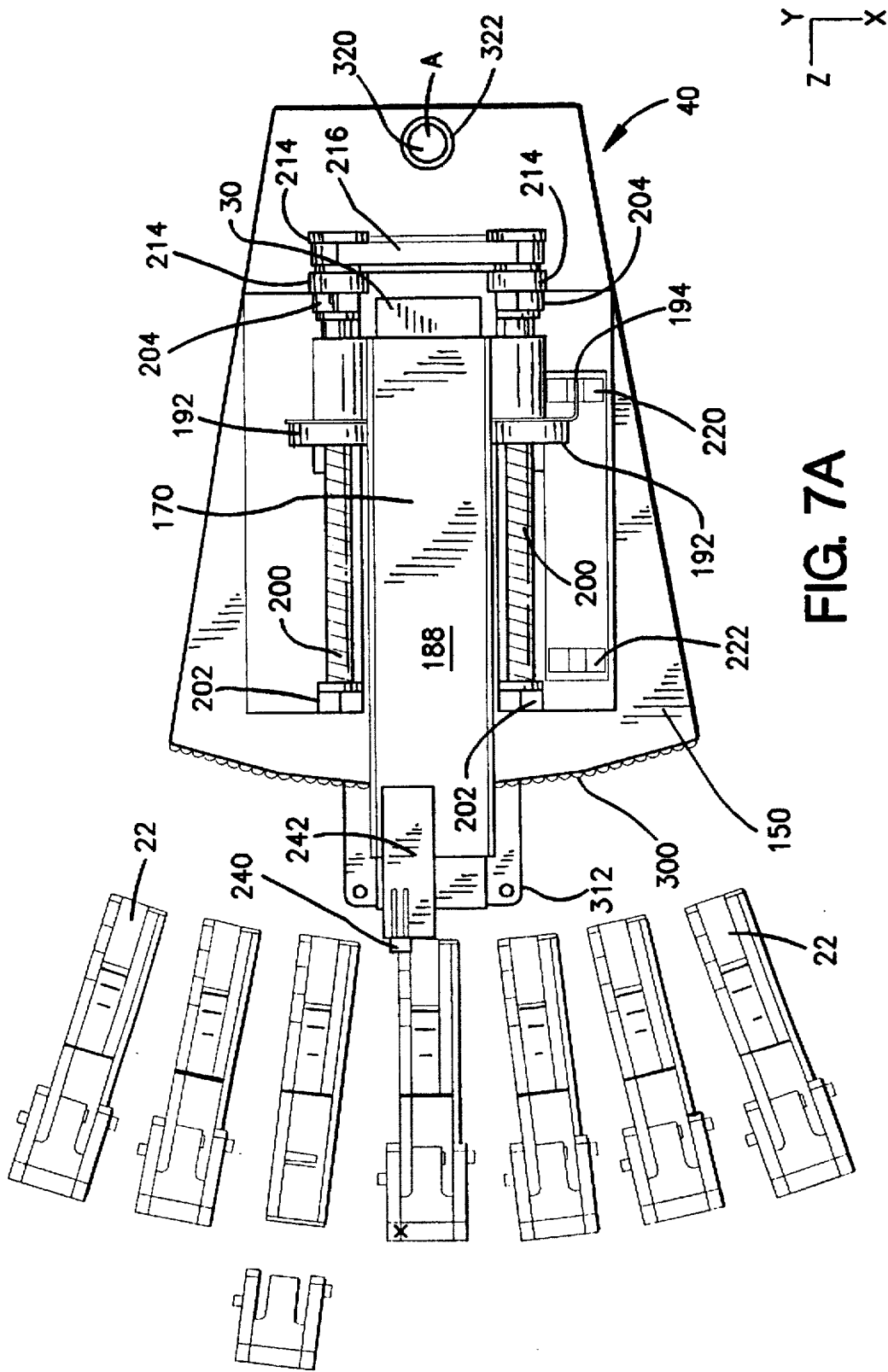
FIG. 7A is a top view of portions of the cartridge library of FIG. 1 without a housing, showing a tape drive of the library in a cartridge unloaded position.
Figure 7B:
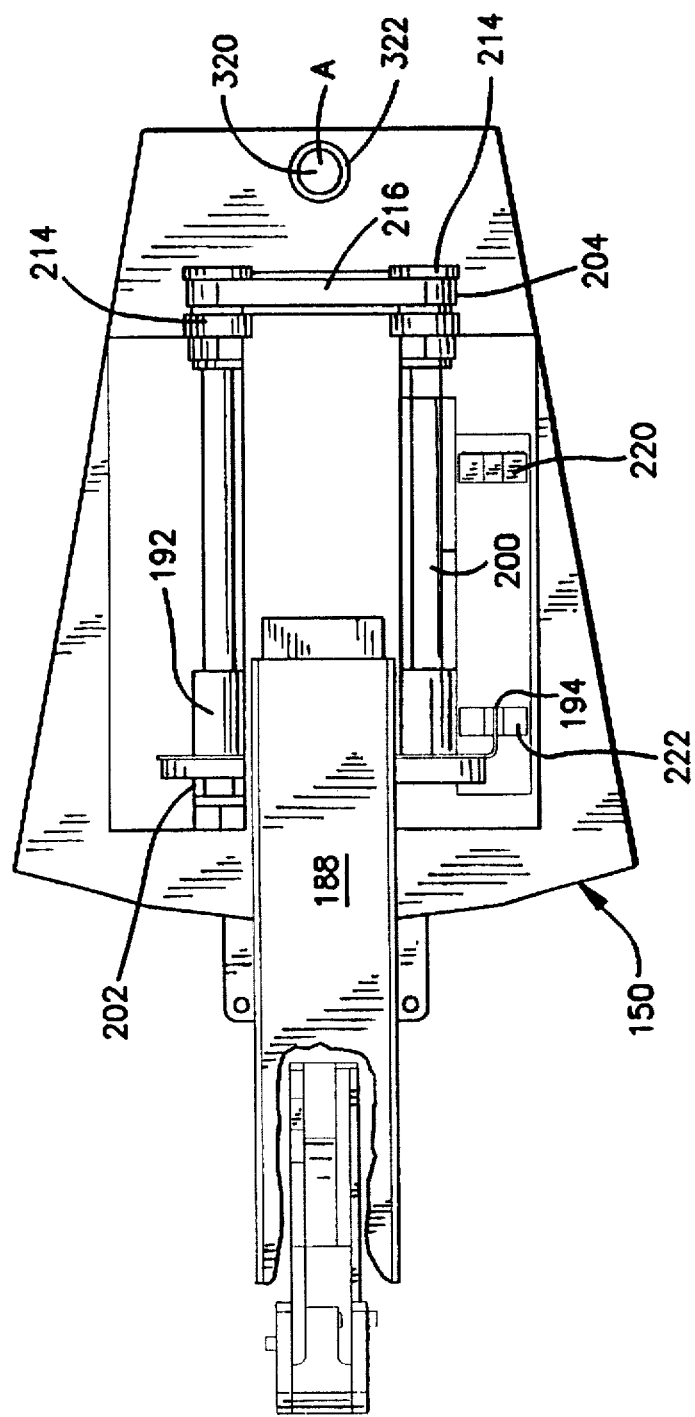
FIG. 7B is a top view of portions of the cartridge library of FIG. 1 without a housing, showing a tape drive of the library in a cartridge loaded position.

FIG. 1A shows a cartridge library 20, according to a first embodiment of the invention, for storing cartridges of information storage media, e.g., magnetic tape cartridges or cassettes 22. Library 20 includes a housing 26; an input/output (I/O) tape drive 30 enclosed in housing 26; and (as better seen in FIGS. 4–6) a transport system 40 for transporting or moving the tape drive 30 relative to cartridges 22, including along a drive transport path 42 between an unloaded position and a cartridge loaded position. Whereas FIG. 1 and FIG. 7A are among the figures showing tape drive 30 in an unloaded cartridge position, FIG. 1B and FIG. 7B show tape drive 30 in a loaded cartridge position. Operation of library 20, including movement of tape drive 30 between its various positions as herein described, is under supervision of a controller 44 (see FIG. 5B).

Library 20 is connected to an unillustrated host computer or host computer system so that data transduced by drive 30 from or to media in cartridges 22 can be applied to or received from the host. The host is connected both to drive 30 for controlling input/output (e.g., recording and reading) operations relative to the media. The host is also connected to controller 44 for controlling operation of library 20 as hereinafter described.

Various drawings including FIG. 1A show library 20 in a rectangular coordinate frame of reference with mutually orthogonal axes X, Y, and Z.

Library housing 26 includes a housing bottom wall 50; a housing right side wall 52; a housing left side wall 53; a housing rear wall 54; a housing front wall 56; and, a housing top wall 58. Housing top wall 58 has a library lid 60 which is pivotable about hinge 62.

Figure 2:
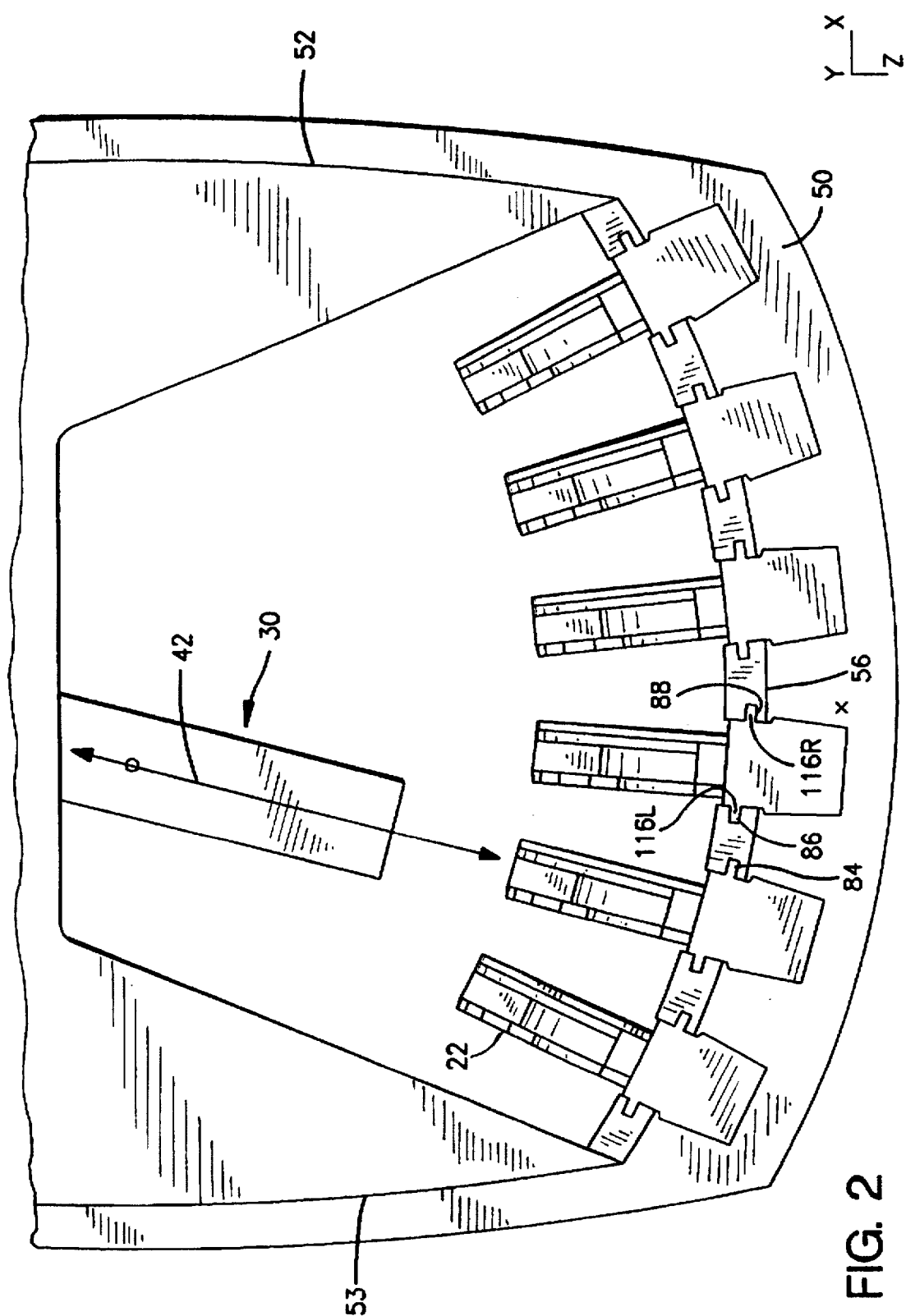
FIG. 2 is a partial top view of the cartridge library of FIG. 1.

In the embodiment illustrated herein, housing front wall 56 serves as a cartridge holder of library 20. As shown in FIG. 1A and FIG. 2, housing front wall 56 is curved or arcuate in shape. Housing front wall 56 has a plurality of apertures 70 formed therein, six such apertures 70 being illustrated in FIG. 1A. At the particular instant shown in FIG. 1A, five of the six apertures 70 are filled or occupied with cartridge spines 80. As discussed hereinafter, each cartridge spine 80 accommodates a cartridge 22.

Each aperture 70 is a rectangular slot having a major dimension extending along the Y axis and a minor dimension extending along the curvature of wall/holder 56. Apertures 70 divide front wall into two end pillars 81L, 81R and five intermediate pillars 82. Each pillar 82 has a left orientation channel 84 and a right orientation channel 86 formed along the height thereof (in the Y direction). Pillar 81R has only a left orientation channel 84; pillar 81L has only a right orientation channel 86. As explained in more detail hereinafter, orientation channels 84 and 86 facilitate proper (up-right) orientation of cartridge spines 80 where spines 80 are slidably inserted into apertures 70.

As indicated above, each aperture 70 slidingly receives a cartridge spine 80. Cartridge spine 80 is shown in more detail in FIG. 3A–FIG. 3D. Cartridge spine 80 generally has the shape of an elongated rectangular block having an elongated, generally rectangularly-mouthed interior cavity 90 (see FIG. 4). Spine 80 has an exterior front surface 92; two opposing exterior lateral surfaces 93L and 93R; an exterior top surface 95; and, an exterior bottom surface 96.

Cartridge spine 80 as a pair of resilient cartridge retaining fingers 100 which extend in spaced-apart, cantilever fashion into cavity 90 (see FIG. 3C). Although only an upper finger 100 is shown in FIG. 3C, it should be understood (e.g., with reference to FIG. 4) that a lower finger 100 is also symmetrically provided with respect to spine cavity 90. Cartridge retaining finger 100 has a projection 102 thereon. Finger 100 and projection 102 are so positioned and sized that projection 102 engages a notch 104 in cartridge 22 when cartridge 22 is fully inserted into cavity 90 of spine 80.

Figure 3E:
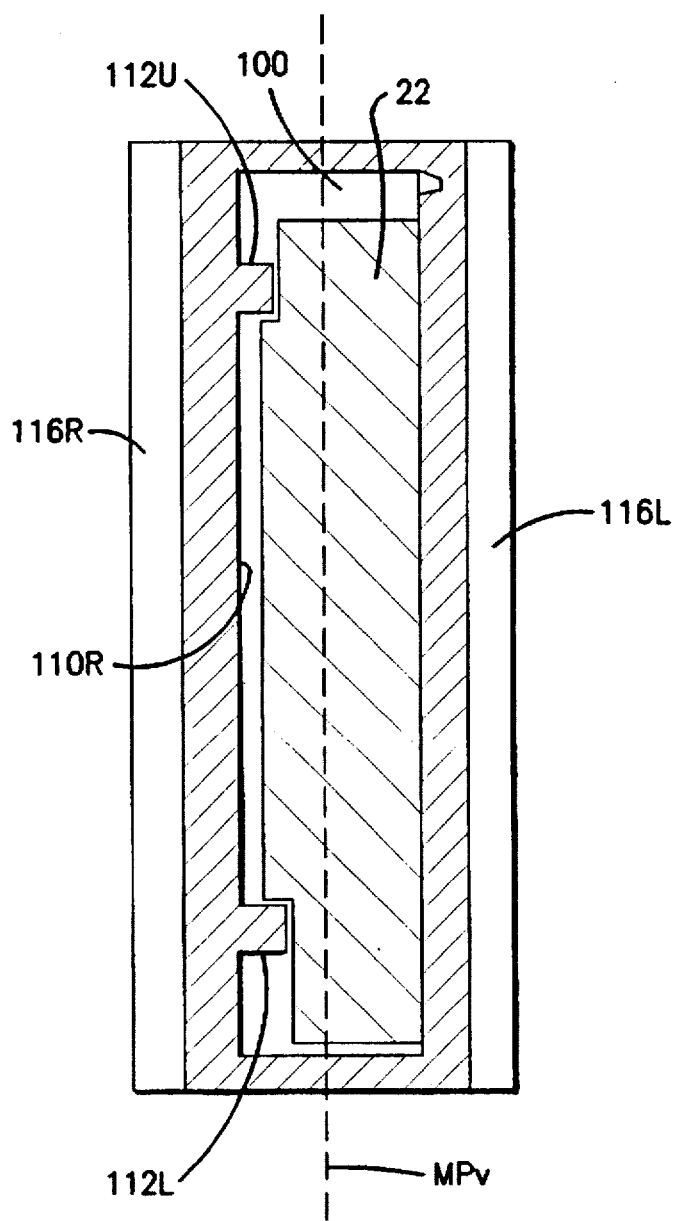
FIG. 3E is a rear view, partially broken, of the cartridge and cartridge spine of FIG. 3A.

Spine 80 has two opposing interior walls 110L, 110R (see FIG. 3D). Extending orthogonally into cavity 90 from wall 110R are cartridge stabilization and orientation flanges 112U, 112L. As shown in FIG. 3E, on interior wall 110R there is both an upper stabilization flange 112U and a lower stabilization flange 112L. Left interior wall 110L is not provided with corresponding flanges, but instead is flat. Thus, given the profile of cartridge 22, it is impossible to insert cartridge 22 upside-down into spine 80 since flanges 112U, 112L would impede insertion of the flat side of cartridge 22 in an inverted position into spine 80. The asymmetrical positioning of flanges 112 about vertical midplane $MP_y$ of spine 80 thus serves to require proper orientation of cartridge 22 into spine 80. Although shown in FIG. 3E as being spaced apart from spine top and bottom walls, it should be understood that flanges 112U, 112L can extend continuously from the spine top wall or the spine bottom wall to the positions shown in FIG. 3E.

Spine exterior surfaces 93L, 93R have notched sections 114L, 114R, respectively, bordering the mouth of interior cavity 90. As shown (from above) in an XZ plane in FIG. 3B, notched sections 114L, 114R are at a distance D1 from spine exterior front surface 92. Notched sections 114L, 114R of spine exterior surfaces 93L, 93R have respective orientation flanges 116L, 116R formed thereon. Whereas orientation flange 116L is spaced by a distance DL from the beginning of notched section 114L, orientation flange 116R is spaced by a distance DR from the beginning of notched section 114R. As shown in FIG. 3B, DL is greater than DR, with the result that orientation flange 116L is spaced further from spine exterior front surface 92 than is orientation flange 116R. In fact, orientation flange 116L is positioned to slide (in the sense of the Y direction) into right orientation channel 86 and orientation flange 116R is positioned to slide into left orientation channel 84 of library front wall/holder 56 (see FIG. 2).

Thus, cartridge spine 80 has its two exterior side surfaces 93L, 93R asymmetrically formed with respect to spine vertical midplane $MP_y$, or front wall 92. Alternatively, the two exterior side surfaces 93L, 93R can be said to be asymmetrically formed with respect to the drive transport path 42 (see FIG. 2). The fact that cartridge spine 80 has its two exterior side surfaces 93L, 93R asymmetrically formed (i.e., asymmetrically positioned flanges 116L, 116R) facilitates a proper orientation of spine 80, and hence cartridge 22, when spine 80 is slid into aperture 70. That is, due to the required mating of flanges 116L, 116R with orientation channels 84, 86, respectively, spine 80 cannot be inserted upside down into aperture 70.

It should be understood that the invention encompasses yet other ways of asymmetrically forming the two exterior side surfaces 93L, 93R. For example, one of the flanges 116L, 116R can be formed to have a greater size (e.g., thickness) than the other. Whatever manner of providing asymmetry is adopted, it should be understood that corresponding channels 84, 86 in the library housing should be suitably asymmetrically formed.

When housing lid 60 is pivoted about hinge 62 to its open position, a selected cartridge spine 80 (engaging its cartridge 22) can be slid out of it corresponding aperture 70 in the Y axis direction in the manner of spine 80S shown in FIG. 1A. That is, spine 80 is slidable in a direction which is perpendicular to the drive transport path 42. To facilitate manual grasping of spine 80, spine exterior side surfaces 93L, 93R have a grip indentation formed 120 thereon (see FIG. 1A, FIG. 3A and FIG. 3D).

The library shown herein is thus particularly suitable for tape transport technologies in which some portion of a cartridge (e.g., a cartridge rear end) remains projecting or protruding out of the tape drive at all times. Such protrusion facilitates attachment of the cartridge 22 (e.g., via spine 80) to the library while the drive moves onto the cartridge.

In the illustrated embodiment, spine 80 is configured and sized to engage resiliently in its interior cavity 90 a magnetic tape cartridge 22 of a type known as a TRAVAN™ cartridge (TRAVAN is a trademark of Minnesota Mining and Manufacturing). It should be understood, however, that the principles of the invention are not limited to this specific cartridge, but have applicability to other cartridges as well as described above.

As indicated above, transport system 40 transports or moves the tape drive 30 relative to cartridges 22, cartridges 22 being retained in housing 22 by spines 80 as aforedescribed. Transport system 40 comprises a transport shelf 150; a radial transport subsystem 152 for transporting tape drive 30 along a drive approach transport path 42 (e.g., in a radial sense in the first embodiment); and, an angular transport subsystem 154 for angularly rotating transport shelf 150 about an axis A of rotation (see FIG. 5A and FIG. 7A) for alignment with a selected one of the cartridges 22 mounted on curved library wall/holder 56. Radial transport subsystem 152 is mounted on transport shelf 150.

Radial transport subsystem 152 transports tape drive 40 in a drive transport path 42 between a unloaded position and a cartridge loaded position. In being transported from the unloaded position to the cartridge loaded position, tape drive 30 internally receives a portion of a cartridge 22 mounted on housing wall/holder 56. As shown in FIG. 5, for the embodiment of FIG. 1A, drive transport path 42 is a linear path extending in a radial direction from rotation axis A to cartridge 22.

Figure 5A:
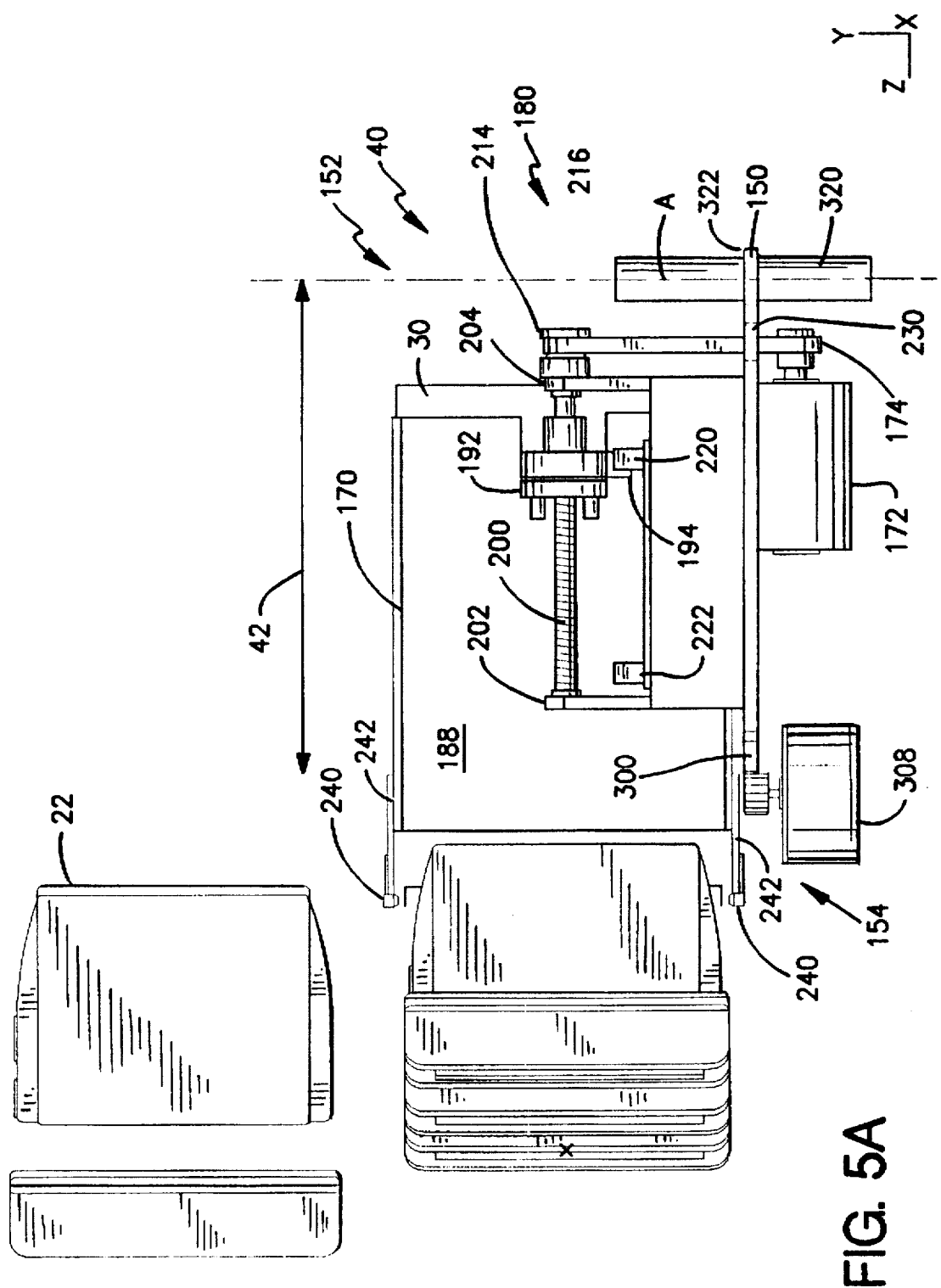
FIG. 5A is a side view of portions of the cartridge library of FIG. 1 without a housing.

Radial transport subsystem 152 comprises a tape drive carriage 170; a radial direction motor 172 with a rotating output shaft 174; and, a motion conversion system 180 (see FIG. 4, FIG. 5A, and FIG. 7A). Motion conversion system 180 converts rotational motion from the rotating output shaft 174 into reciprocating motion for moving tape drive carriage 170 between the unloaded and cartridge loaded positions.

Tape drive carriage 170 engages tape drive 30. In particular, tape drive carriage 170 comprises a four-sided drive casing or jacket 188 having opened ends through which tape drive 30 extends. Drive jacket 188 has a pair of rectangular-shaped jacket handles 190 orthogonally extending from opposing exterior side surfaces thereof, as shown in FIG. 4 and FIG. 7A, for example. Jacket handles 190 each carry a jacket translation nut 192. Depending from a distal end of one of the jacket handles 190 is a path position sensor trip member 194 (see FIG. 4).

Motion conversion system 180 comprises a pair of helically threaded drive screws 200 mounted on opposite sides of drive jacket 188. Each drive screw 200 has a screw front end rotatably mounted in a bearing contained in front mounting post 202 and a extends through a bearing contained in rear mounting post 204. Each pair of mounting posts 202 and 204 are, in turn, mounted on a corresponding carriage block 210. Carriage blocks 210 are mounted on transport shelf 150.

Jacket translation nuts 192, mentioned previously as being attached to drive jacket 188, are interiorly threaded for threaded engagement with threaded drive screws 200. As such, nuts 192 fit over corresponding ones of drive screws 200. Each drive screw 200 has a screw rear end which has a pulley 214 mounted thereon.

Rotation of drive screws 200 causes drive jacket 188, and consequentially tape drive 30 contained therein, to travel along a transport path in the direction shown by arrows 42. Rotation of drive screws 200 is accomplished by motor 172 having rotating output shaft 177. Pulley belt 216 is entrained about the two pulleys 214 (at rear ends of drive screws 200) and about a pulley mounted on rotating output shaft 177 of motor 172. When tape drive 30 is in a cartridge unloaded position, path position sensor trip member 194 interrupts a beam of an unloaded position sensor 220 in the manner shown in FIG. 7A. When tape drive 30 is in a cartridge loaded position, path position sensor trip member 194 interrupts a beam of a cartridge loaded position sensor 222 in the manner shown in FIG. 7B. Both sensors 200 and 222 are mounted on one of carriage blocks 210.

As shown in FIG. 4, transport shelf 150 has a shelf slot 230 provided therein so that pulley 216 may extend from its entrainment about rotating output shaft 177 of motor 172 to its entrainment about pulleys 214. Shelf slot 230 facilitates mounting of motor 172 on an underside of transport shelf 150.

A cartridge sensor 240 is mounted on drive jacket 188 (see, for example, FIG. 4 and FIG. 5A). As explained herein, sensor 240 is employed both for detecting the position and presence of cartridges 22. Cartridge sensor 240 comprises an aligned optical emitter and optical detector, the emitter and detector being carried on jacket extension brackets 242.

Jacket extension brackets are mounted on exterior edge surfaces of drive jacket 188 in such manner that a beam between the emitter and the detector of sensor 240 is interrupted by an edge of a cartridge 22. Sensor 240 senses the edges of cartridges 22 in library 20 so that the drive 30 can be correctly aligned to the cartridge as drive 30 rotates about axis A by virtue of angular transport subsystem 154.

Figure 5B:
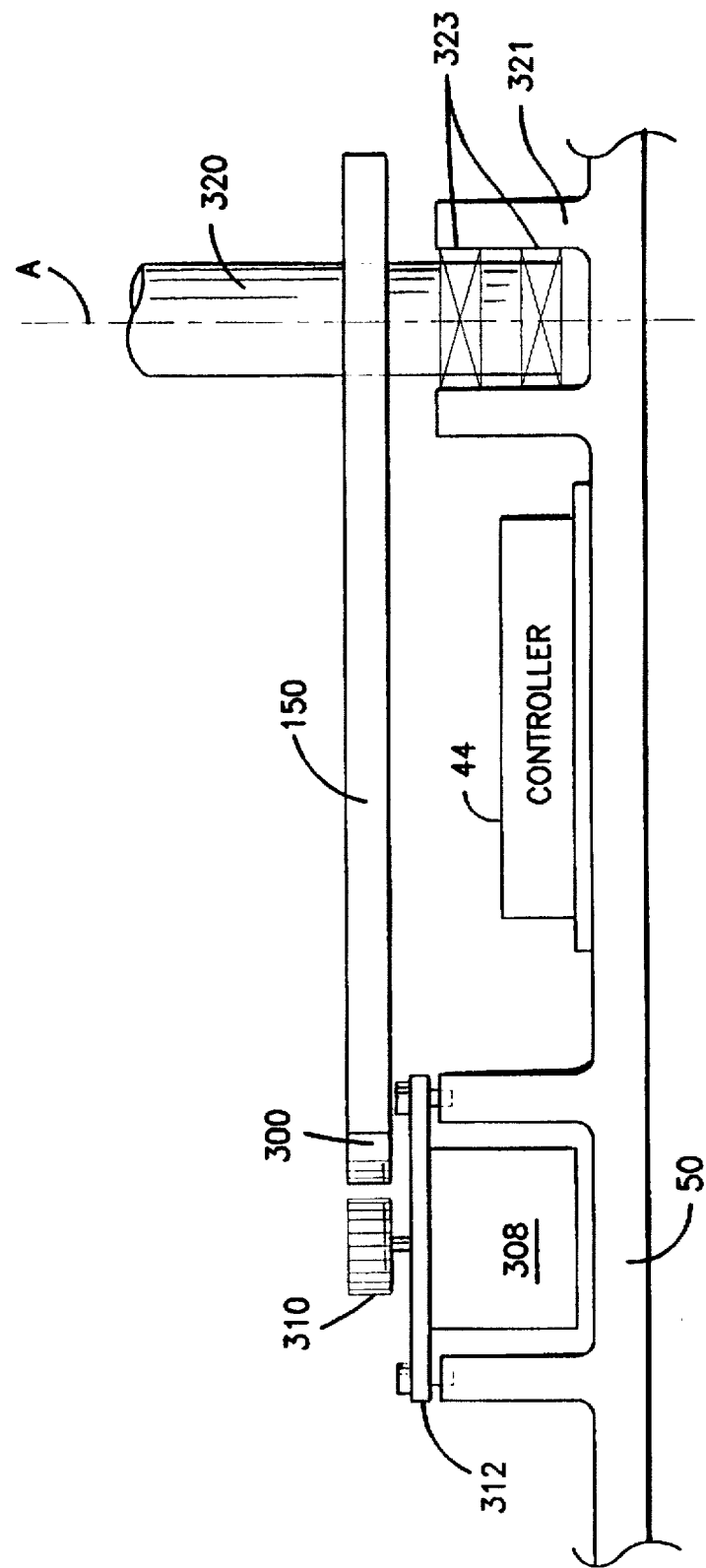
FIG. 5B is a partial side view of bottom portions of the cartridge library of FIG. 1 without a housing.

As illustrated in FIG. 5A, FIG. 5B, and FIG. 7A, transport shelf 150 has a toothed front edge 300. Tooth front edge 300 is utilized by angular transport subsystem 154. In particular, angular transport subsystem 154 comprises an angular direction motor 308 having a rotating output shaft to which a threaded gear 310 is attached. Motor 308 is mounted on motor mounting bracket 312, which in turn in secured by fasteners to a motor well 313 formed on housing floor 50 (see FIG. 5B). Motor 308 is positioned so that the toothed circumference of gear 310 on its output shaft engages toothed front edge 300 of transport shelf 150. Rotation of gear 310, caused by activation of motor 308, causes gear 310 to travel along toothed front edge 310 of shelf 150. That is, the rotational motion from the rotating output shaft of motor 308 is converted to an angular displacement of transport shelf 150 about axis A.

The angular displacement of transport shelf 150, and consequentially tape drive 30 mounted therein, is about axis A. Axis A (parallel to the Y direction) is collinear with a center of upstanding rotational shaft 320. Shaft 320 is rotatably received in shaft well 321 formed on housing floor 50 (see FIG. 5B). Transport shelf 150 has an aperture aligned with axis A and particular sized so that shaft 320 snugly fits in the shelf aperture. Shaft well 321 is provided with bearings 323 which rotatably receive the bottom of shaft 320.

Although not shown herein, library 20 has a sensor for determining when library lid 60 is opened and a interlock mechanism. If library lid 60 is opened, any movement (angularly or radially) of drive 30 ceases. Thus, if a drive 30 has engaged a cartridge 22 (and even if drive 30 is performing input/output operations with respect to cartridge 22), lid 60 can be opened (although drive 30 can continue its input/operations, drive 30 will not be permitted to move while lid 60 is opened).

In operation, after library lid 60 is opened, one or more cartridges 22 are positioned in library 20. Positioning of a cartridge 22 is library 20 beings with inserting cartridge 22 into an interior cavity 90 of a selected cartridge spine 80. When cartridge 22 is properly positioned within a cartridge spine 80, projections 102 on cartridge retaining fingers 100 engage notches 104 in cartridge 22. The cartridge 22 is stabilized in spine 80 by the opposing pairs of stabilization flanges 112R, 112L. In addition, as mentioned before, the asymmetry of flanges 112R, 112L preclude cartridge 22 from being inserted incorrectly in spine 80 (e.g., upside-down).

Positioning of a cartridge 22 in library 20 continues with the sliding of spine 80, with its inserted cartridge 22, into an appropriate vacant aperture 70 in library front wall/holder 56. In particular, the cartridge-laden spine 80 is situated above the selected aperture 70 (in the sense of the Y direction). In connection with such situating, to ensure up-right orientation of cartridge 22 relative to tape drive 30, left orientation flange 116L on spine 80 is aligned with a right orientation channel 84 in library front wall/holder 56, and likewise right orientation flange 116R is aligned with a left orientation channel 86. Upon achieving proper alignment, spine 80 with its inserted cartridge is slid in the Y direction into aperture 70. The direction of sliding is thus perpendicular to the drive transport path 42.

Tape drive 30 should be in its unloaded position as shown in FIG. 1A and FIG. 7A, for example, when a cartridge is loaded in the manner described above. When it is desired to conduct an input/output operation with respect to one of the cartridges 22 housed in library 20, radial displacement of tape drive 30 to its cartridge loaded position will be necessary, and possibly angular displacement of tape drive 30 will be necessary so that tape drive 30 can have loaded therein a desired one of the plurality of cartridges with which to perform the input/output operation.

Automated operation of library 20 is under supervision of controller 44 (see FIG. 5B). Although electrical connections of controller 44 are not illustrated, it will be understood that controller 44 is connected to all motors and sensors of library 20, including motors 172 and 308 and sensors 220, 220, and 240. In addition, controller 44 is connected to receive input commands, e.g., from an unillustrated operator panel and from an unillustrated host computer.

In response to command (either operator selection on an operator input panel or a command from the host), controller 44 endeavors to align drive 30 with the selected one of cartridges 22 with respect to which input/output operations are to be conducted. If necessary, controller 44 first implements an inventory procedure to determine precise locations of cartridges 22 within library 20.

In its inventory procedure, controller 44 activates angular transport subsystem 154 so that drive 30, and cartridge sensor 240 thereon, are rotated through a full range of motion about axis A. During is sweep across the entire library, cartridge sensor 240 detects the edges of each cartridge 22 and apprises controller 44 of the edges. From the edge information, controller 44 computes a center position for each cartridge 22 with respect to axis A. By computing the cartridge center positions, controller 44 can take into condition any skewed or irregular placement of a cartridge in library 20, rather than merely presume a nominal cartridge position.

Knowing the exact position of each cartridge 22 in library 20, controller 44 determines whether tape drive 30 is aligned with the selected one of cartridges 22 with respect to which input/output operations are to be conducted. At any instant controller 44 knows the angular position of each cartridge 22 about axis A, as well as (by virtue of a tachometer on motor 308) the position of tape drive 30 relative to axis A. If controller 44 determines that tape drive 30 is not perfectly angularly aligned with respect to the selected cartridge 22, controller 44 activates angular direction motor 308 so that transport shelf 150 is rotated about axis A to a sufficient degree that the selected cartridge 22 is perfectly angularly aligned with tape drive 30. The degree of activation of motor 308, and hence the degree of rotation of shelf 150, can be determined either by tachometer count or by sensing the appropriate cartridge using cartridge sensor 240.

After angular alignment of tape drive 30 and the selected cartridge 22 is achieved as described above, controller 44 activates radial direction motor 172. Activation of radial direction motor 172 causes rotation of pulley belt 216, which in turn causes rotation of pulleys 214 about which pulley belt 216 is entrained. Since pulleys 214 are mounted on rear ends of drive screws 200, the drive screws 200 rotate. As explained above, the threaded relationship between rotating screws 200 and jacket translation nuts 192 cause drive jacket 188, and consequentially tape drive 30 carried therein, to translate or move in the radial direction along drive transport path 42 toward the selected cartridge 22. During the approach of drive 30 toward the cartridge, the selected cartridge 22 is detected by sensor 240.

When trip member 194 carried by drive jacket 188 interrupts a beam of cartridge loaded position sensor 222, sensor 222 signals controller 44 to turn off motor 172 and thereby cease radial travel of tape drive 30. At this point, cartridge 22 should be partially positioned in tape drive 30 in the manner shown in FIG. 1B and FIG. 7B, so that the cartridge 22 is effectively loaded in tape drive 30. A sensor within drive 30 detects and confirms that a cartridge 22 has been loaded therein.

When a cartridge 22 is loaded into tape drive 30 in the manner shown in FIG. 7B, for example, input operations (reading on the tape of the cartridge) and/or output operations (recording on or erasing the tape of the cartridge) can be performed. Upon completion of the input/output operations, tape drive 30 signals controller 44. If controller 44 determines that tape drive 30 is to release cartridge 22, controller 44 activates radial direction motor 172 so that tape drive 30 is carried radially away from cartridge 22. Radial movement of tape drive 30 away from cartridge 22 along drive transport path 22 is essentially the reverse from the loading operation described above, but with motor 172 being driven in reverse so that screws 200 rotate in an opposite direction from the loading operation. Motor 172 is deactivated, and hence radial transport of tape drive 30 stopped, when sensor trip member 194 interrupts unloaded position sensor 220. Thereafter, if necessary, controller 44 can require an angular displacement of tape drive 30 as would be necessary, for example, if a different cartridge were to require an input/output operation. That is, tape drive 30 can be angular rotated about axis A of rotation so that a subsequently selected one of a plurality of cartridges 22 can be operated upon, the cartridges 22 being arcuately arranged on a curved library front wall/holder 56.

Thus, it is seen from the foregoing that in library 20, tape drive 30 is transported in a drive transport path 42 from an unloaded position to a cartridge loaded position while the cartridge 22 remains at the cartridge storage location on library front wall/holder 56.

It should be understood that principles of the present invention are not limited to the embodiments described herein. For example, the shape of libraries (e.g., the arrangement of cartridges 22) need not be as shown and described. For example, in another embodiment a library of the present invention has cartridges circularly arranged about axis A at an angle greater than that shown, such as 360 degrees, for example (a circular library). Nor is the number of cartridges 22 housed in any particular library of the invention deemed critical or limiting.

Figure 8:
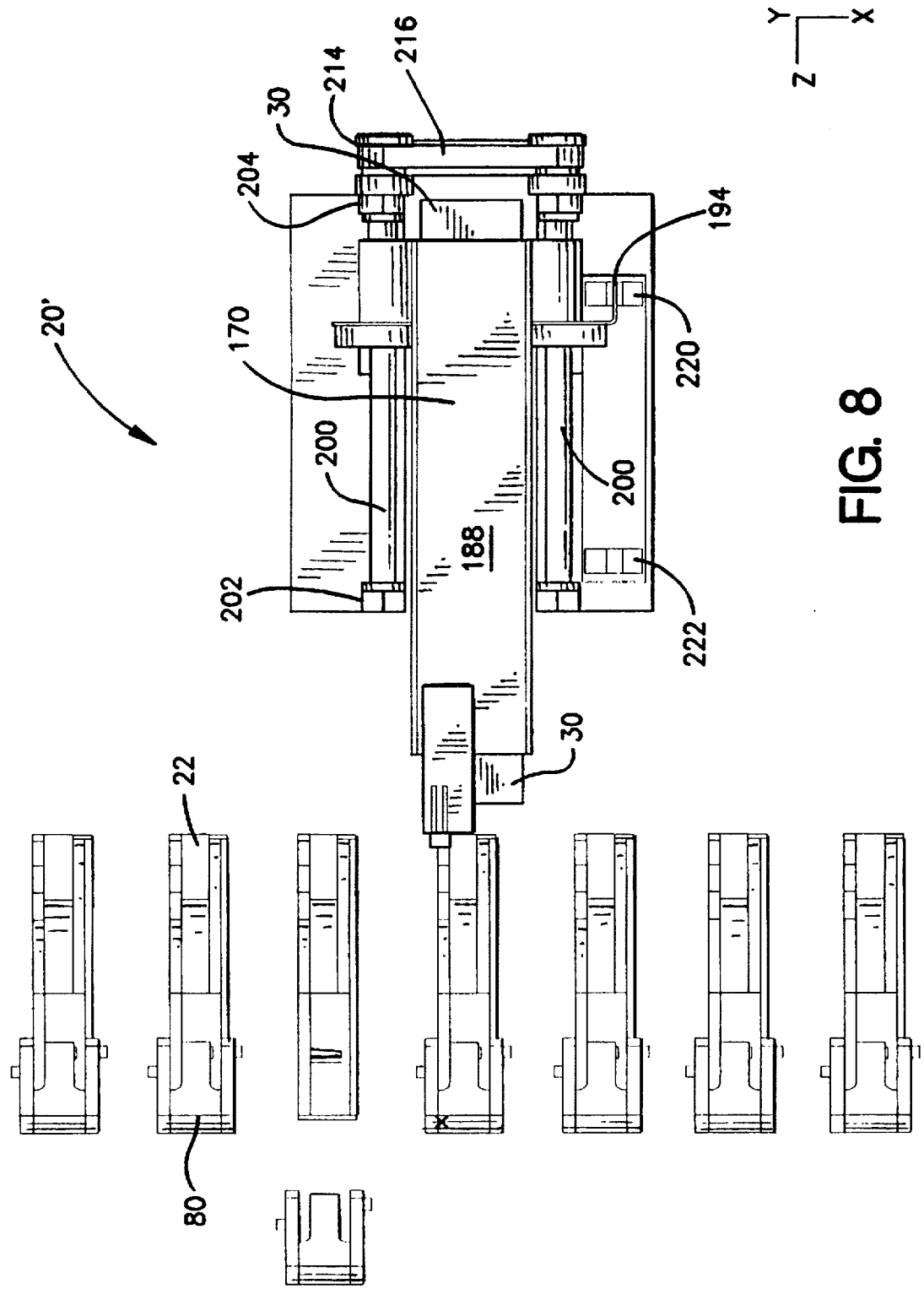
FIG. 8 is a schematic top view of a cartridge library of a second or linear embodiment of the invention.

In the above regard, FIG. 8 schematically shows another embodiment of the present, particularly library 20'. In distinction from library 20 of FIG. 1, library 20' has its cartridges 22 linearly rather than arcuately arranged. Library 20' is thus said to be a linear library. Not having arcuately arranged but instead linearly arranged cartridges, library 20' has a linear (X direction) transport subsystem rather than an angular transport subsystem. The person of skill in the art will readily understand how such a linear transport subsystem is constructed and operated, so that explicit description herein is unnecessary. In other respects, structure and operation of library 20' resembles that of library 20, including the usage of spines 80 for insertion of cartridges 22.

Moreover, the present invention is not limited to a library having a stationary front library wall 56. Rather, a rotating carousel type structure could take the place of library wall 56 as providing a plurality of cartridge storage locations. What is required, however, is that the cartridge 22 remain stationary at the cartridge storage location while tape drive 30 travels toward and away from the cartridge 22 situated at the storage location.

As used herein, the term "library" is intended to encompass any automated cartridge or cassette handling system, including stacker-type handling systems which typically have less intelligence or sophistication than a library. It should also be understood that "cartridge" and "cassette" are understood to be synonymous herein.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. An automated cartridge handling system for storing cartridges of information storage media, the cartridge handling system comprising:

a cartridge holder which defines a cartridge storage location whereat at least one cartridge can be mounted;

a tape drive movably mounted with respect to the cartridge holder;

a transport system for transporting the tape drive in a drive transport path between a unloaded position and a cartridge loaded position, and wherein in being transported from the unloaded position to the cartridge loaded position by the transport system the tape drive receives at least a portion of the at least one cartridge; and wherein the cartridge holder is stationary relative to the drive transport path.

2. The apparatus of claim 1, further comprising a housing, and wherein the housing has a housing wall, wherein the housing wall has an arcuate shape, wherein a plurality of cartridges are mounted on the wall, and wherein the transport system includes rotational transport subsystem for rotating the tape drive for alignment with a selected one of the cartridges.

3. The apparatus of claim 2, further comprising a housing, and wherein the housing has a wall having a first orientation channel formed on a first side of the aperture and a second orientation channel formed on a second side of the aperture, the first orientation channel and the second orientation channel being asymmetrical with respect to the drive transport path; wherein a first of the exterior surfaces and a second of the exterior surfaces of the cartridge spine are opposing surfaces; wherein the first of the exterior surfaces has a first orientation flange formed thereon for mating with the first orientation channel and the second of the exterior surfaces has a second orientation flange formed thereon for mating with the second orientation channel.

4. The apparatus of claim 1, further comprising a housing, and wherein the housing has a wall having a planar shape and wherein a plurality of cartridges are mounted on the wall, and wherein the transport system includes a linear transport subsystem for aligning the tape drive with a selected one of the cartridges.

5. The apparatus of claim 1, further comprising a housing, and wherein the housing has a housing wall, wherein the housing wall has an arcuate shape, wherein a plurality of cartridges are mounted on the wall, and wherein the transport system includes rotational transport subsystem for rotating the tape drive for alignment with a selected one of the cartridges.

6. The apparatus of claim 1, further comprising a housing, and wherein the housing has a wall having a planar shape and wherein a plurality of cartridges are mounted on the wall, and wherein the transport system includes a linear transport subsystem for aligning the tape drive with a selected one of the cartridges.

7. The apparatus of claim 1, wherein the cartridge storage location is an aperture, wherein a cartridge spine is insertable in the aperture, and wherein the cartridge spine is sized to accommodate internally the cartridge.

8. The apparatus of claim 7, wherein the cartridge spine comprises a block having two exterior surfaces and an interior cavity sized to accommodate therein the cartridge, the cartridge spine having a resilient cartridge retaining member which selectively engages a cartridge in the interior cavity, the cartridge spine having its two exterior surfaces asymmetrically formed.

9. The apparatus of claim 8, further comprising a housing, and wherein the housing has a wall having a first orientation channel formed on a first side of the aperture and a second orientation channel formed on a second side of the aperture, the first orientation channel and the second orientation channel being asymmetrical with respect to the drive transport path; wherein a first of the exterior surfaces and a second of the exterior surfaces of the cartridge spine are opposing surfaces; wherein the first of the exterior surfaces has a first orientation flange formed thereon for mating with the first orientation channel and the second of the exterior surfaces has a second orientation flange formed thereon for mating with the second orientation channel.

10. The apparatus of claim 8, wherein the cartridge spine further has flanges asymmetrically formed in its interior cavity.

11. The apparatus of claim 8, wherein the cartridge spine is insertable into the aperture in a direction which is perpendicular to the drive transport path.

12. The apparatus of claim 8, wherein the resilient cartridge retaining member is formed in the interior cavity.

13. The apparatus of claim 12, wherein the resilient cartridge retaining member comprises a cantilevered member having a distal end formed to engage a cartridge notch of the cartridge.

14. An automated cartridge handling system for storing cartridges of information storage media, the cartridge handling system comprising:
a cartridge holder having an aperture therein for defining a cartridge storage location;
a cartridge spine inserted in the aperture in the cartridge holder;
a tape drive movably mounted with respect to the cartridge holder;
a transport system for transporting the tape drive in a drive transport path in a direction toward the cartridge spine.

15. A method of operating a cartridge handling system which houses information storage cartridges, the method comprising:
positioning a cartridge in a cartridge storage location in the cartridge handling system;
transporting a tape drive in a drive transport path from an unloaded position to a cartridge loaded position wherein the tape drive receives the cartridge while the cartridge remains at the cartridge storage location;
using an input/output element of the tape drive to perform input/output operations with respect to media housed in the cartridge while the cartridge remains at the cartridge storage location.

16. The apparatus of claim 15, wherein the transport shelf has a toothed edge, and wherein the angular transport subsystem comprises:
a motor with a rotating output shaft;
a gear in contact with the rotating output shaft and the toothed edge of the transport shelf for converting rotational motion from the rotating output shaft to an angular displacement of the transport shelf.

17. The apparatus of claim 16, wherein the motor is mounted on the housing.

18. The apparatus of claim 16, wherein the radial transport subsystem comprises:
a tape drive carriage which engages the tape drive;
a motor with a rotating output shaft;
a motion conversion system which converts rotational motion from the rotating output shaft into reciprocating motion for moving the tape drive carriage between the unloaded and cartridge loaded positions.

19. An automated cartridge handling system for storing cartridges of information storage media, the cartridge handling system comprising:
a cartridge holder having an aperture therein for defining a cartridge storage location;
a cartridge spine inserted in the aperture in the cartridge holder;
a tape drive movably mounted with respect to the cartridge holder;
a transport system for transporting the tape drive in a drive transport path in a direction toward the cartridge spine; and
wherein the cartridge spine is held stationary in the aperture in a direction parallel to the drive transport path.

20. The apparatus of claim 19, wherein the cartridge spine is insertable into the aperture in a direction which is perpendicular to the drive transport path.

21. The apparatus of claim 20, wherein the cartridge holder comprises a housing having a lid thereon, and wherein the cartridge spine is slidable out of the aperture when the lid is open.

22. The apparatus of claim 20, wherein the cartridge spine comprises a block having at two exterior surfaces and an interior cavity sized to accommodate therein the cartridge of information storage media, the cartridge spine having a resilient cartridge retaining member which selectively engages a cartridge in the interior cavity, the cartridge spine having its two exterior surfaces asymmetrically formed.

23. The apparatus of claim 22, wherein the resilient cartridge retaining member is formed in the interior cavity.

24. The apparatus of claim 23, wherein the resilient cartridge retaining member comprises a cantilevered member having a distal end formed to engage a cartridge notch of the cartridge.

25. The apparatus of claim 22, wherein the cartridge holder has a first orientation channel formed on a first side of the aperture and a second orientation channel formed on a second side of the aperture, the first orientation channel and the second orientation channel being asymmetrical with respect to the drive transport path; wherein a first of the exterior surfaces and a second of the exterior surfaces of the cartridge spine are opposing surfaces; wherein the first of the exterior surfaces has a first orientation flange formed thereon for mating with the first orientation channel and the second of the exterior surfaces has a second orientation flange formed thereon for mating with the second orientation channel.

26. The apparatus of claim 25, further comprising a housing, the housing having a lid thereon, and wherein the cartridge holder forms part of the housing, and wherein the cartridge spine is slidable out of first and second orientation channels of the aperture when the lid is open.

27. The apparatus of claim 22, wherein the cartridge spine further has a stabilization flange formed in its interior cavity.

28. The apparatus of claim 22, wherein the cartridge holder has an arcuate shape and wherein a plurality of apertures are provided on the cartridge holder, each aperture having a cartridge spine inserted therein; and wherein the transport system includes rotational transport subsystem for rotating the tape drive for alignment with a selected one of the cartridges.

29. The apparatus of claim 28, wherein the tape drive is rotated about an axis of rotation, and wherein the tape drive path is a radial path extending from the axis of rotation in a direction toward the cartridge spine.

30. The apparatus of claim 29, wherein the transport system comprises:

a transport shelf;

a radial transport subsystem for transporting the tape drive in a linear path in a radial direction with respect to the axis of rotation, the radial transport subsystem being mounted on the transport shelf;

an angular transport subsystem for angularly rotating the transport shelf about the axis of rotation.

31. The apparatus of claim 30, wherein the transport shelf has a toothed edge, and wherein the angular transport subsystem comprises:

a motor with a rotating output shaft;

a gear in contact with the rotating output shaft and the toothed edge of the transport shelf for converting rotational motion from the rotating output shaft to an angular displacement of the transport shelf.

32. The apparatus of claim 31, further comprising a housing, and wherein the motor is mounted on the housing.

33. The apparatus of claim 31, further comprising a housing, and wherein the motor is mounted on the housing.

34. A method of operating a cartridge handling system which houses information storage cartridges, the method comprising:

positioning a cartridge in a cartridge storage location in the cartridge handling system;

transporting a tape drive in a drive transport path from an unloaded position to a cartridge loaded position wherein the tape drive receives the cartridge while the cartridge remains stationary at the cartridge storage location;

using an input/output element of the tape drive to perform input/output operations with respect to media housed in the cartridge while the cartridge remains at the cartridge storage location.

35. The method of claim 34, wherein the step of transporting the tape drive from an unloaded position to a cartridge loaded position includes converting rotational motion from an output shaft of a motor to linear movement of a carriage which engages the tape drive.

36. The method of claim 34, further comprising the step of rotating the tape drive to a selected angular position about an axis of rotation, and wherein the step of transporting the tape drive from an unloaded position to a cartridge loaded position includes transporting the tape drive in a radial path between the axis of rotation and a selected one of a plurality of cartridges arcuately arranged on a curved cartridge handling system housing.

37. The method of claim 34, wherein the step of positioning the cartridge in the cartridge storage location in the cartridge handling system involves inserting the cartridge in a cartridge spine and inserting the cartridge spine in an aperture formed in a cartridge holder of the cartridge handling system.

38. The method of claim 37, wherein the step of inserting the cartridge spine in an aperture formed in the cartridge holder of the cartridge handling system comprises sliding the cartridge spine into the aperture in a direction perpendicular to the drive transport path.

39. The method of claim 37, wherein the step of inserting the cartridge spine in an aperture formed in the cartridge holder of the cartridge handling system comprises sliding the cartridge spine into the aperture whereby orientation an orientation flange provided on the cartridge spine is aligned with an orientation channel formed in the housing.

\* \* \* \* \*